(No Model.)

D. F. TOOMEY.
HOSE CLAMP.

No. 427,132. Patented May 6, 1890.

Witnesses.
Arthur J. Sangster
Harriet Johnson

Daniel F. Toomey, Inventor.
By James Sangster, Attorney.

UNITED STATES PATENT OFFICE.

DANIEL F. TOOMEY, OF DUNKIRK, NEW YORK.

HOSE-CLAMP.

SPECIFICATION forming part of Letters Patent No. 427,132, dated May 6, 1890.

Application filed August 20, 1889. Serial No. 321,390. (No model.)

*To all whom it may concern:*

Be it known that I, DANIEL F. TOOMEY, a citizen of the United States, residing in Dunkirk, in the county of Chautauqua and State of New York, have invented certain new and useful Improvements in Hose-Clamps, of which the following is a specification.

This invention relates to certain new and useful improvements in devices for clamping hose for use in steam-heating apparatus for railroad-cars or for other purposes, and will be fully and clearly hereinafter described and claimed, reference being had to the accompanying drawings, in which—

Figure 1:
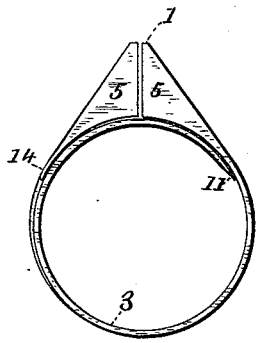
Figure 2:
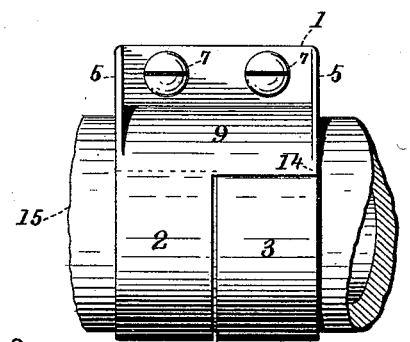
Figure 3:
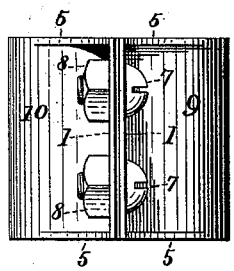
Figure 4:
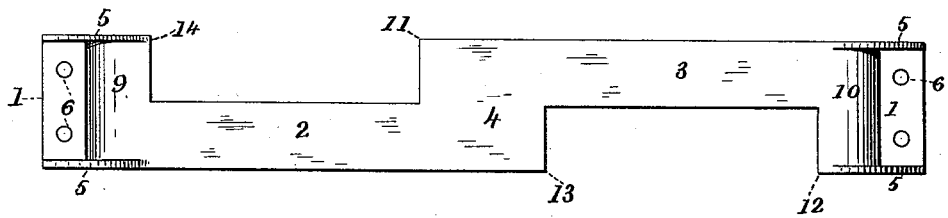

Figure 1 is an end elevation. Fig. 2 is a side elevation showing a portion of hose clamped within it. Fig. 3 is an elevation looking at it toward the end of the clamping-jaws or in the direction of the arrow V, Fig. 2. Fig. 4 is a plan of the device on a reduced scale before it is turned or rolled up into the form shown in Figs. 1, 2, and 3.

The object of my invention is to make a simple and convenient device for securing a clamp to a rubber or other hose, or for any purpose for which a hose-clamp is adapted.

I construct my clamp, first, from a blank substantially in the form shown in Fig. 4, having the body portion 4 of the same width as the two jaws 1 and having two portions, each one-half the width of the body, cut away from each side, so as to leave the two longitudinal portions 2 and 3 each of one-half of the width of the portion 4 of the jaws 1, which are at opposite ends, as shown. To strengthen the jaws 1, two side flanges 5 may be formed with or connected to them in any well-known way. This body portion is preferably made of malleable cast-iron, as being the cheapest and strongest material adapted for the purpose; but any other material capable of being bent into form may be used. The jaws 1 are provided with holes 6 to receive the screw-bolts 7, and nuts 8 for clamping them together.

The next operation after forming the body, as shown in Fig. 4, is to form it into the shape shown in Fig. 1. The portion 2, forming one half of the width of the main body, the portion 3 forming the other half, and the portion 4 are directly under the jaws 1 or under the portions 9 10, so that the corner 14 will be in the position shown in Figs. 1 and 2, and the corner 11 in the position shown in Fig. 1. The corners 12 13 being on the opposite side of said figures, are consequently not shown.

In Fig. 2 I have shown a portion of hose 15 in position within the clamp. From this construction it will be seen that both the portions 2 and 3, including the jaws and central portion 4, are each of sufficient length to form the entire circumference and a little more, so that when formed it consists of two body-pieces 2 and 3, united by the portion 4, and having the jaws 1 at opposite ends, the whole formed in one piece. It is therefore simple, strong, and durable.

I claim as my invention—

1. A hose-clamp consisting of the wide portion 4, the longitudinal opposite narrow portions 2 and 3, provided with fastening-jaws, the whole made of flexible material and each formed into a circle, and the two jaws brought together by screw-bolts, substantially as described.

2. A hose-clamp-body blank consisting of the central portion 4, two oppositely-arranged longitudinal narrow portions 2 and 3, and jaws 1, the whole being made of flexible material, substantially as described.

DANIEL F. TOOMEY.

Witnesses:
JAMES SANGSTER,
ARTHUR J. SANGSTER.